March 15, 1960 J. E. MILLER Re. 24,799

GASKET AND PIPE END CONSTRUCTION FOR BELL AND SPIGOT PIPE

Original Filed Feb. 1, 1952

Inventor,
Joseph E. Miller,
By: Robert L. Kahn
Atty

United States Patent Office

Re. 24,799
Reissued Mar. 15, 1960

24,799

GASKET AND PIPE END CONSTRUCTION FOR BELL AND SPIGOT PIPE

Joseph E. Miller, deceased, late of Oak Park, by Northern Trust Company, executor, Chicago, Ill., assignor, by mesne assignments, to Press Seal Gasket Corporation, Fort Wayne, Ind., a corporation of Indiana

Original No. 2,815,228, dated December 3, 1957, Serial No. 269,401, February 1, 1952. Application for reissue May 4, 1959, Serial No. 810,979

5 Claims. (Cl. 285—230)

Figure 1:
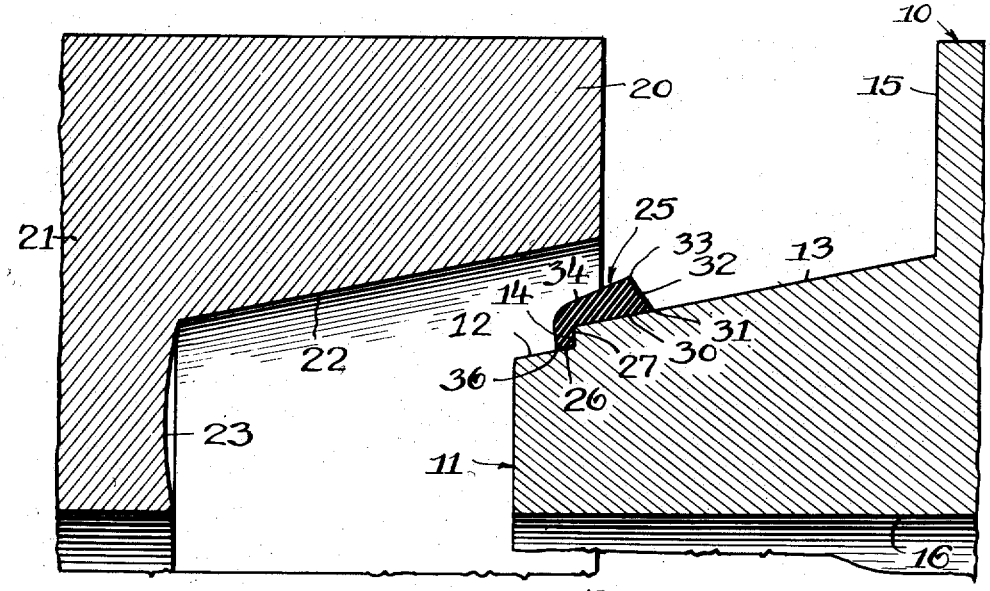

Matter enclosed in heavy brackets [ ] appears in the original patent but forms no part of this reissue specification; matter printed in italics indicates the additions made by reissue.

This invention relates to a gasket and pipe end construction particularly for use with pipe for sewer lines, and the like. This invention is useful with low pressure, large size pipe made of concrete, steel or a combination of steel and concrete, or of ceramic material. Such pipe, as a rule, is made in diameters ranging from about 6″ to as much as 72″ and even greater. The new gasket may be advantageously used with the specific pipe end construction disclosed here, though the gasket has general utility with low pressure large size pipe.

The pipe with which the present invention is adapted to be used, generally comes in definite lengths such as 3′, 10′ or 20′ or longer and has the ends generally shaped to form bell and spigot respectively. Thus the bell end of one pipe section may be fitted over the spigot end of the adjacent pipe section with a gasket at the joint. As is well known in this class of pipe, the bell and spigot ends of the pipe sections are not formed with great accuracy. Tolerances, in general, may run as high as a quarter of an inch or more.

With certain types of gaskets, it is necessary to machine the bell and spigot faces so that substantial accuracy is attained. As may be well understood, such an operation greatly increases the expense of installing the pipe. Frequently, this finishing operation is omitted and a certain amount of leakage is tolerated. In many instances, such leakage may be dangerous to health, particularly where sewer and water-pipes are adjacent to each other.

In addition to the problem of large tolerances in the bell and spigot ends of pipes, it is necessary that a gasket for sealing a pipe joint be sufficiently flexible so that some give for movement of the pipe sections relative to each other may be tolerated without impairing the quality of the seal. Finally, it is important that the gasket be economical and practical.

The gaskets of the prior art, as a rule, have rarely proven satisfactory in all respects. Thus, most gaskets are rendered ineffective by the final operation of putting a pipe section tightly in place with the bell over the spigot end of the adjacent pipe section. Such gaskets, as a rule, are caught between the approaching pipe surfaces and are generally rolled over or otherwise deformed in a manner to render them substantially useless. This is particularly true when it is considered that both the bell and spigot surfaces of the pipe ends generally taper. Hence, as a new section is pulled into position, the approaching bell and spigot tapering surfaces generate powerful forces tending to dislodge and turn over any gasket disposed therein.

This invention provides a gasket which is simple, economical and so constructed that it tends to lock itself into position as the surfaces of the bell and spigot approach each other. The gasket forming the subject matter of this invention is sufficiently massive so that substantial tolerances and movement of one pipe section with respect to another pipe section is possible.

The invention also provides a pipe end construction with which the new gasket may be advantageously used. The combination of new gasket and pipe end construction is particularly effective.

Figure 2:
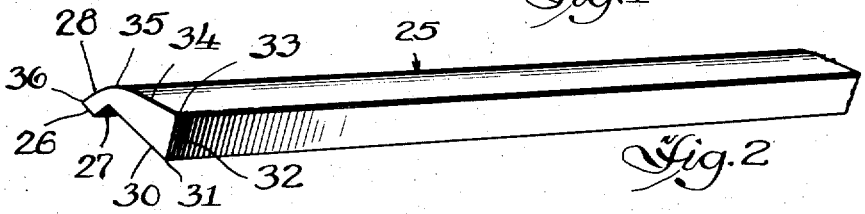
Figure 3:
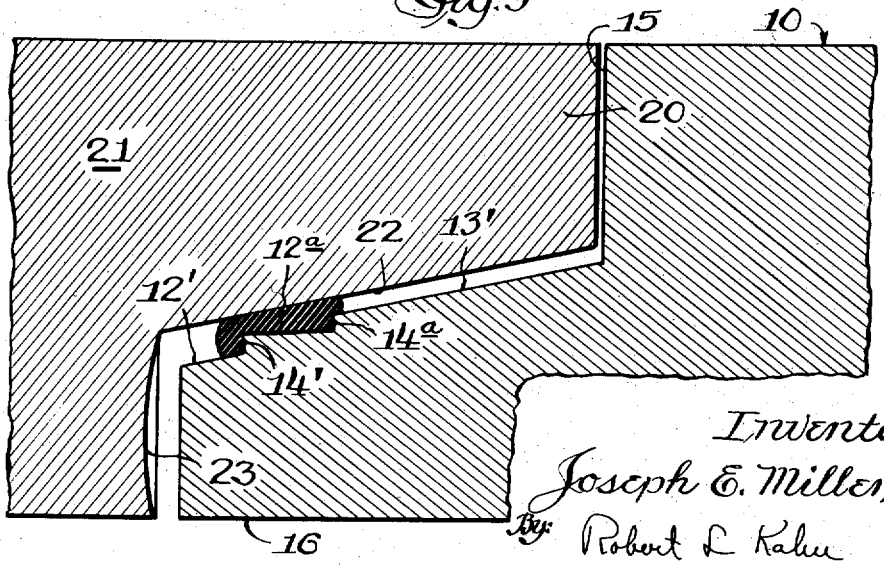

In order that the invention may be understood, it will now be explained in connection with the drawings wherein: Figure 1 is a sectional detail showing the ends of two pipes and a section of the gasket forming the subject matter of the present invention. Figure 2 is a perspective view of a piece of gasket material embodying the present invention. Figure 3 is a sectional detail similar to Figure 1 but showing the new spigot construction.

Referring now to the drawings, pipe 10 of any construction, has spigot generally indicated by numeral 11. This spigot end comprises portions 12 and 13 connected together by vertical step 14. Portion 13 is substantially longer than portion 12 and terminates in wall portion 15. From wall portion 15 the pipe diameter generally remains constant and the pipe may follow any one of a number of conventional constructions. The other end of the pipe is formed as a bell, this being the same as the bell described herein on another length of pipe. It is understood that pipe 10 has its internal pipe surface 16 of conventional construction.

Cooperating with spigot 11 of pipe 10 is well portion generally indicated by numeral 20 of adjacent pipe length 21. Bell 20 has surface 22 which may be a frustum of a cone, the bell terminating in wall portion 23. Bell surface 22 and spigot surface 13 generally taper as shown, the taper usually being of the order of about ¼″ for each inch of length of end section. This taper is merely exemplary and it is understood that in practice, other tapers or no taper may be used. As a rule, surfaces 22 and 13 are generally parallel when pipes 10 and 21 are disposed in axial alignment. However, this need not necessarily be and the gasket forming the subject matter of this invention does not require this to be true. Reduced spigot portion 12 also may taper or not, as desired. In practice, this reduced portion has a generally cylindrical surface and the width or height of step 14 may generally be of the order of about ¼″.

Disposed over the stepped end of the spigot is gasket 25 of suitable resilient material. Thus gasket 25 may be made of molded rubber. The gasket has a cross-sectional shape as shown. Thus the gasket has forward inner surface 26 to overlie cylindrical end 12. Rearwardly of surface 26 is ledge 27. Ledge 27 preferably forms an angle of about 90° with surface 26 as seen in section, thus providing forward portion 28 for the gasket. Adjacent ledge 27 is rear inner surface 30. Gasket surface 30 preferably has a length axially along the pipe surface of about between two and four times the dimension of surface 26, although a greater ratio may be used. Surface 30 of the gasket terminates in rear edge 31 from which edge rear surface 32 extends. As seen in section, this rear surface appears as a straight line, extending upwardly from rear inner surface 30 of the gasket at an angle substantially less than 90°. Rear surface 32 of the gasket terminates in outer edge 33. From outer edge 33 forwardly of the gasket there is generally straight portion 34 which merges with rounded front portion 35, going down to front edge 36 of the gasket.

It is important that edge 33 of the gasket, when projected downwardly to opposite surface 30 of the gasket, should fall between rear edge 31 and ledge 27 of the gasket. In practice, the angle between surfaces 32 and 34 of the gasket as shown in section will be of the order of 90° and preferably greater than 90°. It is thus seen that by having a gasket of the cross-section shown, a massive heel portion consisting of face 32 and part of face 30 will be formed.

The gasket will generally be cemented or glued in position, as shown, to form an endless gasket. Thereafter, the adjacent section of pipe with a bell end will be positioned. The bell end will be moved over the spigot end. During the movement of the bell over the spigot, any tendency for bell face 22 to engage the gasket will not result in excessive turning the gasket over away from the spigot end, as has usually been the case. Rounded front face 35 will permit the bell to start over the spigot easily.

In the construction shown, any tendency for the gasket to be turned clockwise will be resisted by the massive heel portion previously described. It is obvious that at any section planes any turning moment of the gasket will be around some point below outer edge 33 of the gasket and left of rear edge 31. By virtue of the construction, a large base area for the gasket is provided which tends to resist such turning moment. The locking action of the ledge against the stepped end of the pipe will prevent the gasket from being moved axially along the spigot. The tendency of the gasket will be to lock tightly.

Thus as an example, I have successfully used a gasket having the following dimensions: surface 30, ¾", ledge 27, ¼", surface 26, ¼", surface 32, ½", surface 34, ¾", and radius of curved portion 35, ¼". The height of edge 33 above surface 30 was ½" while the angle between 30 and 32 was substantially 60°.

It is understood that these dimensions are exemplary and that a variation in shapes and sizes is possible, depending upon the particular shape and size of pipe involved. The gasket material, thus far described, is primarily used for low pressure pipe where the pressure of liquid in the pipe does not extrude the rubber from its position. The extrusion pressure is directed against surface 32, when external pressure exceeds internal pressure, as under water. When reverse pressure conditions exist, the extrusion pressure is against surfaces 35 and 34.

Step 27 of the spigot end of the pipe may be omitted and the gasket used on the extreme end of the pipe so that gasket ledge 27 bears against the end face of the pipe.

The gasket shown in Figures 1 and 2 is particularly effective when used with a multi-stepped spigot construction illustrated in Figure 3. In this figure, the pipe ends are drawn together to compress and distort the gasket. Thus the bell end is similar to the bell in Figure 1. The spigot end, however, has portions 12', 12a and 13' with steps 14' and 14a. Portions 12' and 13' are generally parallel and preferably have a slope of about 10° to 15° to the pipe axis, with a preferred slope of about 12°. Portion 12a has substantially less slope. Thus portion 12a may have a zero angle to the pipe axis or a small angle of about 3°. The angle provides a draft for removal of the iron ring during pipe manufacture. Step 14a and 14' are separated a distance equal to the dimension of surface 30 as seen in the section. The clearance between spigot surface 13' and bell surface 22', when the gasket is properly compressed, may be about ⅛" or ¼". In general, the clearances and dimensions may vary somewhat upon the pipe diameter. The compressed gasket will also have somewhat different sections depending upon the degree of compression, angles and dimensions.

Gasket retention is sufficiently good so that cementing of the gasket on the spigot may be eliminated. It is understood that the gasket ends are cemented to make an endless gasket.

The spigot construction shown in Figure 3 tends to anchor the gasket firmly in position as the bell and spigot are telescoped. Only the outer and rear gasket portions roll rearwardly to any substantial extent. Thus the gasket remains in position during pipe installation. It is understood that the gasket is cemented in position.

It is also possible to use the spigot end in Figure 1 to simulate the effect in Figure 3. Thus in Figure 1, by having portion 12 dimensioned to accommodate gasket surface 30, gasket ledge 27 will bear against the end of the pipe while gasket end 31 will be at step 14.

While I have shown the spigot as provided with one or more steps and the bell as smooth, it is possible to reverse the construction and gasket. Thus the bell interior may be stepped and the gasket reversed so that the outer edge becomes the inner edge instead. The front of the gasket will remain in front in the modified arrangement.

This is a continuation-in-part of my application Serial No. 146,491, filed February 27, 1950.

I claim:

*1.* The combination of a spigot construction for concrete pipe for sewers or the like, and adapted to have a gasket over the spigot to cooperate with the bell end of a similar pipe, said spigot having three stepped surfaces connected by two ledge portions lying in planes substantially perpendicular to the pipe axis, said stepped surfaces tapering with the middle step having substantially less inclination to the pipe axis than the outer steps and a gasket of flexible rubber and having, with respect to the spigot end, forward and rear ends with inner and outer peripheral portions, said inner peripheral portion having two stepped annular surfaces, the outermost annular surface being rearward and having a width axially along the pipe surface of between two and about four times the width of the innermost annular surface, said steps being straight at a gasket cross-section and being connected by a rectangular shoulder whose height between steps is about equal to the width of the innermost annular surface, said shoulder being straight at a gasket cross-section and being slightly inclined forwardly and outwardly with respect to the pipe axis, the front end of the gasket having a face parallel to the shoulder, said face having a width generally equal to the width of the shoulder, the rear of the gasket being formed as an edge of the outermost annular surface, the outer periphery of the gasket being formed as an edge, the gasket having a cross-section such that a straight line joins the outer peripheral portion edge and rear edge, said straight line being inclined outwardly and forwardly, the gasket section having a second straight line extending from the outer peripheral edge and being inwardly and forwardly inclined from said outer edge toward the front of the gasket, said two lines forming an angle therebetween of about 90°, the straight line corresponding to the front face of the gasket in the section being joined to the second line by a curved line which goes from the second line both inwardly and forwardly, said two stepped annular gasket surfaces being disposed over the two end stepped spigot surfaces, the distance between said two ledge portions being substantially equal to the dimensions of the first mentioned outermost annular gasket surface.

*2. The combination of cooperable male and female concrete pipe members, said male member having three annular surfaces respectively connected by generally radially outwardly extending ledge portions at least the rearward one of said annular surfaces tapering outwardly and rearwardly, the rearward annular surface being outermost, said female member having an inner annular surface tapering inwardly and rearwardly, at least a portion of said female member surface being generally parallel with said rearward annular surface of said male member, said male and female member annular surfaces defining an annular space therebetween when said members are assembled to form a joint; and a preformed annular self-supporting gasket of flexible resilient material, said gasket having an annular body portion with a generally wedge-shaped cross section, said body portion having an inner annular surface with an axial length generally coextensive with the axial length of the intermediate one of said male member annular surfaces, said body portion*

*having an outer annular surface which tapers outwardly and rearwardly with a taper greater than the taper of said portion of said inner annular surface of said female member, said body portion at least adjacent its rear section being radially thicker than the radial width of said space, said gasket having an annular flange portion depending from the front end of said body portion, said gasket being seated on said male member with said body portion inner annular surface engaging in sealing relation substantially throughout its length, said intermediate annular surface of said male member and with said flange portion overhanging forward one of said ledge portions and engaging throughout its length the forward one of said annular surfaces of said male member, said radially thicker section of said body portion being compressed between said portion of said female member annular surface and said male member intermediate annular surface as said joint is assembled causing said resilient material to cold-flow toward the forward end of said body portion thereby placing said gasket in compression over its entire length between said portion of said female member annular surface and said male member forward and intermediate annular surfaces when said joint is completely assembled to provide a tight seal for said joint, said male member forward annular surface supporting said gasket annular flange portion thereby preventing disengagement of said gasket from said male member when said joint is disassembled or misaligned.*

*3. The combination of claim 2 wherein each of said male member annular surfaces tapers outwardly and rearwardly.*

*4. The combination of claim 2 in which said forward annular surface of said male member is axially longer than the axial length of said gasket flange portion.*

*5. The combination of claim 2 wherein the rear end of said gasket body portion engages the rearward one of said ledge portions and said gasket annular flange portion engages the forward one of said ledge portions when said joint is completely assembled whereby said gasket is compressed between said portion of said female member annular surface and said male member forward and intermediate annular surfaces and said ledge portions.*

References Cited in the file of this patent or the original patent

UNITED STATES PATENTS

| | | |
|---|---|---|
| 1,014,053 | Dolensky | Jan. 9, 1912 |
| 2,116,705 | Marx | May 10, 1938 |
| 2,223,434 | Trickey | Dec. 3, 1940 |
| 2,280,183 | Bennett | Apr. 21, 1942 |
| 2,322,587 | Payne | June 22, 1943 |
| 2,470,508 | Maky | May 17, 1949 |

FOREIGN PATENTS

| | | |
|---|---|---|
| 33,680 | Denmark | Sept. 8, 1924 |
| 670,217 | Germany | Aug. 6, 1935 |